United States Patent Office 2,919,252
Patented Dec. 29, 1959

2,919,252

COMPOSITION COMPRISING RUBBER AND HALOGENATED POLY-1-OLEFINS

Peter J. Canterino, Bartlesville, Okla., assignor to Phillips Petroleum Company, a corporation of Delaware No Drawing. Application March 8, 1957
Serial No. 644,723

11 Claims. (Cl. 260—4)

This invention relates to ozone-resistant rubber compositions.

A problem in the use of rubber products is that both natural and synthetic rubber undergo an amount of deterioration on prolonged exposure to oxygen or air. This deteriorating effect is the result of ozone-cracking, sometimes called "sun checking." One instance in which ozone-cracking is particularly prevalent is in tire side walls of both the black and white variety.

The following are objects of my invention.

An object of this invention is to provide new rubber compositions. A further object of this invention is to provide rubber compositions which are highly resistant to ozone-cracking. A further object of this invention is to provide rubber compositions containing a mixture of synthetic or natural rubber and a particular type of chlorinated polyethylene.

Other objects and advantages of this invention will be apparent to one skilled in the art upon reading the accompanying disclosure.

I have discovered that new, ozone-resistant rubber compositions can be prepared by blending with a rubber which is subject to ozone-cracking a halogenated, solid polymer of an aliphatic 1-olefin having a maximum chain length of 8 carbon atoms and no chain branching nearer the double bond than the 4-position, and which polymer is produced in the presence of a catalyst comprising chromium oxide including hexavalent chromium. More specifically, my invention comprises mixing rubber, either natural or synthetic, with chlorinated polyethylene which has been prepared by the chlorination of an ethylene polymer resulting from a catalytic, low-pressure ethylene polymerization employing a chromium oxide, silica-alumina catalyst.

My invention is directed to olefin polymers, such as polyethylene, prepared according to the process disclosed in a copending application of J. P. Hogan and R. L. Banks, Serial No. 558,530, filed January 11, 1956. According to this process, the olefin is polymerized at a temperature in the range of 150 to 450° F., the polymerization being advantageously conducted by subjecting to the polymerization conditions, a solution of the olefin in a hydrocarbon solvent such as isooctane. The pressure need be only sufficient to maintain the solution substantially in the liquid phase and is ordinarily in the range of 100 to 700 pounds per square inch. The catalyst comprises generally from 1 to 50 weight percent of chromium in the form of chromium oxide, including a substantial amount of hexavalent chromium, associated with at least one other oxide such as thoria, zirconia, silica, alumina, or a mixture of silica and alumina, e.g., 90 weight percent silica and 10 weight percent alumina. The invention is applicable to olefin polymers in general as long as they are solid materials. Furthermore, copolymers such as ethylene/propylene copolymers, are quite suitable. Polyethylenes prepared according to this invention of Hogan and Banks are characterized by substantial insolubility in carbon tetrachloride at temperatures below the normal boiling point of carbon tetrachloride, and by the fact that their unsaturation is predominantly of the trans-internal and/or terminal vinyl types, so-called "branched-vinyl" unsaturation being substantially absent. These polyethylenes have melting points (determined by cooling curves) of at least 235° F. and often as high as 240° F. or higher. They have molecular weights in the range of a few thousand to 200,000, density above about 0.96, and 90 percent and higher crystallinity at room temperature at equilibrium.

Various methods are suitable for preparing the halogenated olefin polymers for use in admixture with the rubber. One suitable method is disclosed in my copending application Serial No. 442,891, filed July 12, 1954. In the process therein disclosed, the polymer is dissolved in carbon tetrachloride at a temperature within the range of 95 to 130° C., the pressure is raised sufficiently to maintain the carbon tetrachloride substantially in the liquid phase and the halogen is passed through the resulting solution. When about 15 weight percent of combined halogen has been combined with the polymer, the pressure is reduced to about atmospheric and the halogen is passed through the solution at a temperature in the range from about room temperature to the reflux temperature of the solution. When polyethylene is chlorinated according to this process, a chlorinated product is obtained which is soft and rubbery and substantially colorless. It is uniform in appearance, is flexible, and can be molded without discoloration.

Another suitable method for this halogenation is disclosed in a copending application of James N. Baptist and myself, Serial No. 446,666, filed July 29, 1954. In this case, the halogenation of the olefin polymer is conducted in two stages. The polymer is first dissolved in a solvent selected from the group consisting of tetrachloroethane, chlorobenzene, and dichlorobenzene, and the first stage of the halogenation is effected. The second stage is conducted with the partially halogenated polymer in solution in a low-boiling solvent selected from the group consisting of carbon tetrachloride, chloroform, and methylene chloride. Mixtures of solvents in either one of these groups can be used.

Still another method which is suitable is disclosed in another of my copending applications, application Serial No. 700,591, filed December 4, 1957. In this process, the halogenated olefin polymer is prepared by a two-stage process comprising introducing a first amount of halogen into the polymer by contacting a solution thereof with the halogen, cooling the resulting solution to precipitate the halogenated polymer and completing the halogenation of the polymer to the desired halogen content by passing additional halogen into the dispersion of the partially halogenated polymer.

I prefer to use from 25 to 75 parts of rubber with from 75 to 25 parts of halogenated polymer to prepare the blend of my invention. For complete resistance to ozone-cracking, the final blend should contain at least 40 percent by weight of the halogenated polymer. The amount of halogen in the polymer ranges from 10 to 50 percent by weight although I prefer to use materials containing 25 to 35 percent halogen by weight. Obviously, larger amounts of the halogenated polymer can be used but considering physical properties and economics, I prefer to use the above ranges.

Mixing the rubber and the halogenated polymer offers very little problem and can be done by milling the two materials together on a roll mill or in a Banbury mixer.

These halogenated olefin polymers can be blended with many different rubbers which are known to be subject to ozone-cracking. For example, blends of chlorinated polyethylene have been made with natural rubber and with synthetic rubbery polymers, such as copolymers of butadiene and styrene.

After the blend of rubber and halogenated polymer has been made, the blend can be compounded and vulcanized according to methods suitable for the curing of the rubber compound itself. For example, such fillers and reinforcing agents as carbon black and titanium dioxide can be employed in the blends. Sulfur is the common vulcanizing agent. It is sometimes necessary to use larger than normal amounts of softener where a soft product is desired because some of the olefin polymers are somewhat resinous following chlorination.

It is believed that the chlorinated polymers will find the greatest use in this invention because of the availability of chlorine and because of the ease of chlorinating the 1-olefin polymers with this halogen. However, other halogenated polymers, such as brominated polyethylene, can be used.

This invention is further illustrated by the following examples which illustrate specific embodiments of my invention.

Example I

Polyethylene, prepared by the polymerization of ethylene in a catalytic polymerization employing a chromium oxide-silica-alumina catalyst (containing about 0.5 percent by weight of hexavalent chromium), was chlorinated in solution in carbon tetrachloride at 255° F. and 40 p.s.i.g. in the presence of ultra-violet light to a chlorine content of 25.5 percent by weight. This material was blended with natural rubber according to the following recipe. At the same time, chlorinated polyethylene which had been prepared by chlorinating ethylene polymer dissolved in carbon tetrachloride from a non-catalytic, high-pressure polymerization process at 140 to 160° F. in the presence of ultra-violet light was blended with another portion of the same natural rubber. The chlorinated polyethylene for the control had a chlorine content of 22 percent by weight.

| Ingredient | Parts by Weight | |
|---|---|---|
| | Recipe 1 | Recipe 2 |
| Chlorinated polyethylene (chromium oxide catalyst) | 40 | |
| Chlorinated polyethylene (non-catalytic) | | 30 |
| Natural rubber | 40 | 30 |
| Stearic acid | 1.6 | 1.2 |
| Sulfur | 1.6 | 1.2 |
| Hydroquinone monobenzyl ether | 1.2 | 0.9 |
| N,N-dimethyl-S-tert-butylsulfenyl dithiocarbamate | 1.2 | 0.9 |
| Zinc oxide | 4.0 | 3.0 |
| MgO | 3.0 | 3.0 |
| Titanium dioxide | 40 | 30 |

The compounded rubbers of the above recipes were then cured at 307° F. for 30 minutes. The products were evaluated by standard test procedures, and the following data were obtained.

| | Recipe 1 | Recipe 2 | |
|---|---|---|---|
| Tensile, p.s.i. | 1,023 | 1,369 | |
| Elongation, percent | 325 | 1,158 | |
| | | Duplicates | |
| Ozone rating: | | | |
| Days exposed to test conditions | 14 | 7 | 11 |
| Rating [1] | 0 | 9 | Broke |

[1] Relative rating: 0—no cracks; 10—many large cracks.

The ozone rating was determined by cutting samples 4 inches in length and ranging from ½ inch in width on one end to one inch in width on the other. The samples were marked at one inch intervals and were then mounted on racks where they were placed under tension (50 percent overall elongation), after which they were exposed to air containing 23 parts ozone per $10^8$ parts of air.

A control run using natural rubber alone (compounded by recipe 1) had an ozone rating of 4.

It should be noted that the ozone resistance imparted is not of the same order as the proportion of chlorinated, low-pressure polyethylene present. The 50/50 mixture has complete resistance and not one-half that of the rubber.

Example II

Chlorinated polyethylene, prepared by the chlorination of a carbon tetrachloride solution of ethylene polymer which had been prepared by a chromium oxide-silica-alumina catalyzed, low-pressure polymerization, was blended with various rubbers to determine its effect on various properties of these rubbers, particularly the ozone resistance. The catalyst contained about 0.5 percent by weight hexavalent chromium oxide. These blends were made up and compounded according to the following recipes. The chlorinated polyethylene used in these blends contained 33.5 percent by weight of chlorine. It was prepared by dissolving the polymer in carbon tetrachloride and passing chlorine into the solution at a temperature of 250° F. and a pressure of 42 p.s.i.g. in the presence of ultra-violet light.

| | Recipes | | |
|---|---|---|---|
| | 1 | 2 | 3 |
| Chlorinated polyethylene | 100 | 50 | 50 |
| Pale crepe rubber | | 50 | |
| Philprene 1500 [1] | | | 50 |
| Titanium dioxide | | 50 | 50 |
| Stearic acid | 2 | 2 | 2 |
| Sulfur | 2 | 2 | 2 |
| Hydroquinone monobenzyl ether | 1.5 | 1.5 | 1.5 |
| N,N-dimethyl-S-tert-butylsulfenyl dithiocarbamate | 1.5 | 1.5 | 1.5 |
| Zinc oxide | 5 | 5 | 5 |
| MgO | 5 | 5 | 5 |

[1] Philprene 1500 is a butadiene-styrene copolymer prepared by an emulsion polymerization at 41° F. employing an iron-pyrophosphate activator and a rosin acid emulsifier. The polymer contains 20 percent bound styrene and has a raw Mooney viscosity of 52 (ML-4).

The blends which were compounded according to the above recipes were then cured at 307° F. for 30 minutes, after which their physical properties were determined. These physical properties are tabulated below:

| | Polymer from Recipe | | |
|---|---|---|---|
| | 1 | 2 | 3 |
| Tensile strength, p.s.i. | 1,650 | 1,800 | 1,275 |
| Elongation, percent | 430 | 650 | 460 |
| Gehman Freeze Point, ° C. | −30 | −42 | −41 |
| Resilience, percent | 72.7 | 79.2 | 72.5 |
| Ozone resistance | 0 | 0 | 0 |
| Compression set, percent | 23.2 | 13.9 | 10.7 |

As many possible embodiments can be made of this invention without departing from the scope thereof, it is to be understood that all matter herein set forth is to be interpreted as illustrative and not as unduly limiting the invention.

I claim:

1. An ozone resistant rubbery composition, said composition comprising (1) 25 to 75 parts by weight of a rubber subject to ozone cracking selected from the group consisting of natural rubber and synthetic rubbery polymers of conjugated dienes wherein the conjugated diene component is present in major amount and (2) 75 to 25 parts by weight of a halogenated solid polymer containing 10 to 50 percent by weight of halogen of an aliphatic 1-olefin having a maximum chain length of 8 carbon atoms and no chain branching nearer the double bond than the 4 position, said polymer having been produced in the presence of a catalyst comprising chromium oxide including hexavalent chromium, the amount of rubber and halogenated polymer being selected to give a total of 100 parts.

2. The composition of claim 1 wherein said halogenated polymer is a chlorinated polymer.

3. The composition of claim 1 wherein said halogenated polymer is a brominated polymer.

4. An ozone resistant rubbery composition, said composition comprising 25 to 75 parts by weight of natural rubber and 75 to 25 parts by weight of chlorinated solid polyethylene containing 10 to 50 percent chlorine by weight, said polyethylene having been produced in the presence of a chromium oxide-silica-alumina catalyst, said catalyst containing hexavalent chromium, the amount of said rubber and chlorinated polyethylene being selected to give a total of 100 parts.

5. An ozone resistant rubbery composition, said composition comprising 25 to 75 parts by weight of a rubbery copolymer of 1,3-butadiene and styrene, and 75 to 25 parts by weight of chlorinated solid polyethylene containing 10 to 50 percent chlorine by weight, said polyethylene having been produced in the presence of a chromium oxide-silica-alumina catalyst, said catalyst containing hexavalent chromium, the amount of said copolymer and chlorinated polyethylene being selected to give a total of 100 parts.

6. An ozone resistant rubbery composition, said composition comprising 75 to 25 parts by weight of natural rubber and 25 to 75 parts by weight of a chlorinated solid ethylene polymer, said chlorinated ethylene polymer containing 10 to 50 percent chlorine by weight and having been produced in the presence of a chromium oxide-silica-alumina catalyst, said catalyst containing hexavalent chromium, the amount of said rubber and chlorinated polymer being selected to give a total of 100 parts.

7. An ozone resistant rubbery composition, said composition comprising 75 to 25 parts by weight of a rubbery copolymer of 1,3-butadiene and styrene and 25 to 75 parts by weight of a chlorinated solid ethylene polymer, said chlorinated ethylene polymer containing 10 to 50 percent chlorine by weight and having been produced in the presence of a chromium oxide-silica-alumina catalyst, said catalyst containing hexavalent chromium, the amount of said rubbery copolymer of 1,3-butadiene and styrene and chlorinated polymer being selected to give a total of 100 parts.

8. An ozone resistant rubbery composition, said composition comprising 60 to 25 parts by weight of natural rubber and 40 to 75 parts by weight of a chlorinated solid ethylene polymer, said chlorinated ethylene polymer containing 10 to 50 percent chlorine by weight and having been produced in the presence of a chromium oxide-silica-alumina catalyst, said catalyst containing hexavalent chromium, the amount of said rubber and chlorinated polymer being selected to give a total of 100 parts.

9. An ozone resistant rubbery composition, said composition comprising 60 to 25 parts by weight of a rubbery copolymer of 1,3-butadiene and styrene and 40 to 75 parts by weight of a chlorinated solid ethylene polymer, said chlorinated ethylene polymer containing 10 to 50 percent chlorine by weight and having been produced in the presence of a chromium oxide-silica-alumina catalyst, said catalyst containing hexavalent chromium, the amount of said rubbery copolymer of 1,3-butadiene and styrene and chlorinated polymer being selected to give a total of 100 parts.

10. An ozone resistant composition, said composition comprising 75 to 25 parts by weight of a natural rubber and 25 to 75 parts of a chlorinated solid ethylene/propylene copolymer, said chlorinated copolymer containing 10 to 50 percent chlorine by weight and having been produced in the presence of a chromium oxide-silica-alumina catalyst, said catalyst containing hexavalent chromium, the amount of said rubber and chlorinated copolymer being selected to give a total of 100 parts.

11. An ozone resistant composition, said composition comprising 75 to 25 parts by weight of a rubbery copolymer of 1,3-butadiene and styrene and 25 to 75 parts by weight of a chlorinated solid ethylene/propylene copolymer, said chlorinated copolymer containing 10 to 50 percent chlorine by weight and having been produced in the presence of a chromium oxide-silica-alumina catalyst, said catalyst containing hexavalent chromium, the amount of said rubbery copolymer of 1,3-butadiene and styrene and chlorinated copolymer being selected to give a total of 100 parts.

References Cited in the file of this patent

UNITED STATES PATENTS

| | | |
|---|---|---|
| 2,459,874 | Fay | Jan. 25, 1949 |
| 2,465,336 | MacDonald et al. | Mar. 29, 1949 |
| 2,516,591 | Remington | July 25, 1950 |

OTHER REFERENCES

Warner: "Hypalon S-2—A New Elastomer," Rubber Age, volume 71, No. 2, May 1952, pages 205–206.